United States Patent [19]
Carson

[11] Patent Number: 5,600,453
[45] Date of Patent: Feb. 4, 1997

[54] COMPOSITE FRAMED MIRROR AND APPARATUS AND METHOD FOR MAKING SAME

[75] Inventor: Kenneth R. Carson, Shannon, Miss.

[73] Assignee: The Stanley Works, New Britain, Conn.

[21] Appl. No.: 531,451

[22] Filed: Sep. 21, 1995

Related U.S. Application Data

[62] Division of Ser. No. 243,278, May 16, 1994, Pat. No. 5,483,386.

[51] Int. Cl.⁶ ............................ G02B 5/08; B32B 31/00; B30B 5/06; B26D 5/28
[52] U.S. Cl. .................. 359/883; 359/900; 156/368; 156/353; 156/522; 156/552
[58] Field of Search ........................ 359/883, 900; 156/357, 368, 469, 543, 552, 521, 522

[56] References Cited

U.S. PATENT DOCUMENTS

| | | | |
|---|---|---|---|
| 4,259,143 | 3/1981 | Giulie et al. | 156/522 |
| 4,561,929 | 12/1985 | Lenhardt | 156/522 |
| 4,728,386 | 3/1988 | Horvath | 156/552 |
| 5,286,317 | 2/1994 | Treat et al. | 156/353 |

*Primary Examiner*—Paul M. Dzierzynski
*Assistant Examiner*—Mohammad Y. Sikder
*Attorney, Agent, or Firm*—Pepe & Hazard

[57] ABSTRACT

Apparatus for making a framed mirror includes a conveyor for moving a frame with the mirror seated therein to a film application and laminating station and a stop downstream of the laminating station. A cutter station serves the film applied from a roll supply. A control effects operation of the stop and stops unrolling of film from the roll supply. The framed mirror includes a frame with a peripheral portion having front and rear faces and defining an opening extending therethrough and a recess in the rear surface thereof providing a shoulder extending about the opening. The mirror having front and rear surfaces is seated on the shoulder. Synthetic resin sheeting extends over the rear surface of the mirror and over at least a portion of the rear surface of the frame peripheral portion, and is adhesively bonded to the rear surfaces of the mirror and the frame to secure the mirror on the shoulder and to provide resistance to shattering of the mirror.

5 Claims, 4 Drawing Sheets

COMPOSITE FRAMED MIRROR AND APPARATUS AND METHOD FOR MAKING SAME

This is a divisional of application Ser. No. 08/243,278 filed on May 16, 1994, now U.S. Pat. No. 5,433,386.

BACKGROUND OF THE INVENTION

The present invention relates to framed mirrors and more particularly, to an apparatus for producing a novel framed mirror construction.

Framed mirrors are widely employed for many applications, including wall mirrors and doors. Many of the frames are highly ornamental and still others are relatively plain to simply provide a peripheral edge protection for the mirror. The frames for the mirrors generally provide the support for hardware to allow their mounting and this is particularly significant when they are used for sliding doors, bifold doors and the like.

As a result, various techniques have been developed for making framed mirrors for these various applications. Most of these involve inserting the mirror into a recess in the frame and, depending upon the nature of the frame, securing it with clips about the periphery of the mirror or by securing a chip board or like backing member on the back of the frame so as to retain the mirror in the frame. These procedures heretofore employed have generally required hand labor to effect the mounting of the mirror within the frame and attendant cost.

Of recent years, there has an effort to provide a degree of safety against shattering of the mirror by laminating to the rear surface of the mirror a plastic film which will retain the pieces of the mirror thereon in the event that there is an impact or thermal change which results in cracking of the mirror. In addition, there have been various efforts to effect sealing of the edge of the mirror to reduce the tendency for "black edge" or tarnishing of the silver to occur as a result of moisture and other contaminants penetrating the interface between the silver coating and the glass.

It is an object of the present invention to provide a novel apparatus for making a framed mirror in which the mirror is securely retained within the frame and providing resistance to shattering of the mirror.

It is also an object to provide such an apparatus for making a framed mirror in which the edge of the mirror is substantially sealed so as to minimize the tendency for edge tarnishing of the silver coating.

Still another object is to provide apparatus for assembling such framed mirrors expeditiously and with minimal operator involvement.

SUMMARY OF THE INVENTION

It has now been found that the foregoing and related objects may be readily attained in a framed mirror including a frame having a peripheral portion with front and rear faces and defining an opening extending therethrough. The peripheral portion has a recess in the rear surface thereof which provides a shoulder extending about the opening. A mirror having front and rear surfaces is seated in the opening with the peripheral portion of its front surface disposed on the shoulder. Synthetic resin sheeting extends over the rear surface of the mirror and over at least a portion of the rear surface of the frame peripheral portion, and is adhesively bonded to the rear surfaces of the mirror and the frame to secure the mirror on the shoulder and to provide resistance to shattering of the mirror. The sheeting and frame peripheral portion also cooperate to provide a seal for the edge of the mirror.

Preferably, the frame is fabricated from synthetic resin, and is integrally molded. The sheeting has high tensile strength, and is desirably biaxially oriented. The adhesive is a coating of pressure sensitive adhesive on the sheeting.

In the method for making the mirrors, the frame is formed with a peripheral portion having front and rear faces, an opening extending therethrough, and peripheral portion providing a recess. A mirror having front and rear surfaces is seated in the opening with the peripheral portion of its front surface seated on the shoulder. Synthetic resin sheeting is adhesively bonded over the rear surface of the mirror and over at least a portion of the rear surface of the frame peripheral portion to secure the mirror on the shoulder and to provide resistance to shattering of the mirror.

The apparatus for making the framed mirrors includes an elongated frame and a conveyor extending longitudinally of the frame and defining a path therethrough with upstream and downstream ends. The conveyor will move a frame with a mirror therein along the path through the apparatus. A laminating roller is rotatably supported on the frame above the conveyor along its path to bear upon the upper surface of a frame and mirror passing thereunder. A roll supporting shaft for a roll of film is rotatably supported on the frame above the conveyor, and a multiplicity of guide rollers are rotatably supported on the frame to provide a path for film from the roll supporting shaft to the laminating roller for bonding to a frame and mirror.

A stop member is movably supported on the frame in the path at a predetermined distance downstream from the laminating roller, and a cutting member is movably supported on the frame between the laminating roller and stop member at a predetermined distance from the stop member. The apparatus also includes means for moving the cutting member into the path to cut film therein, means for moving the stop member into the path to stop movement of a frame and mirror on the belt, and means for stopping the feed roll shaft to prevent unrolling of film therefrom. Control means is provided for the stopping and moving means to move the stop member into the path to stop movement of a frame and mirror on the conveyor, to stop rotation of the feed roll shaft, and to move the cutting member into the path to sever the film at the trailing end of the frame and mirror on the belt stopped by the stop member. Thereafter the control means moves the stop and cutting members from the path, and releases the stopped frame and mirror for movement along the path and to release the feed roll to allow unrolling of film therefrom.

Preferably, the conveyor includes a belt with a low friction outer surface, and the laminating roller has a resiliently compressible circumferential portion. The cutting member has a heated cutting edge, and the cutting member and stop member are supported for vertical movement on the frame by the moving means.

DETAILED DESCRIPTION OF THE PREFERRED EMBODIMENT

Figure 1:
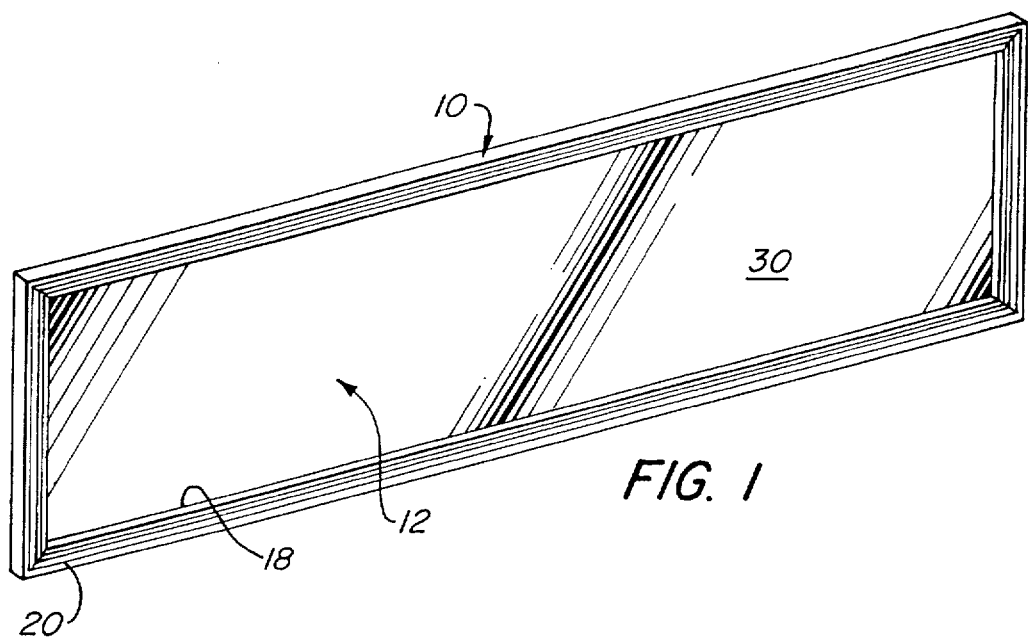
FIG. 1 is a perspective view of a framed mirror embodying the present invention.
Figure 2:
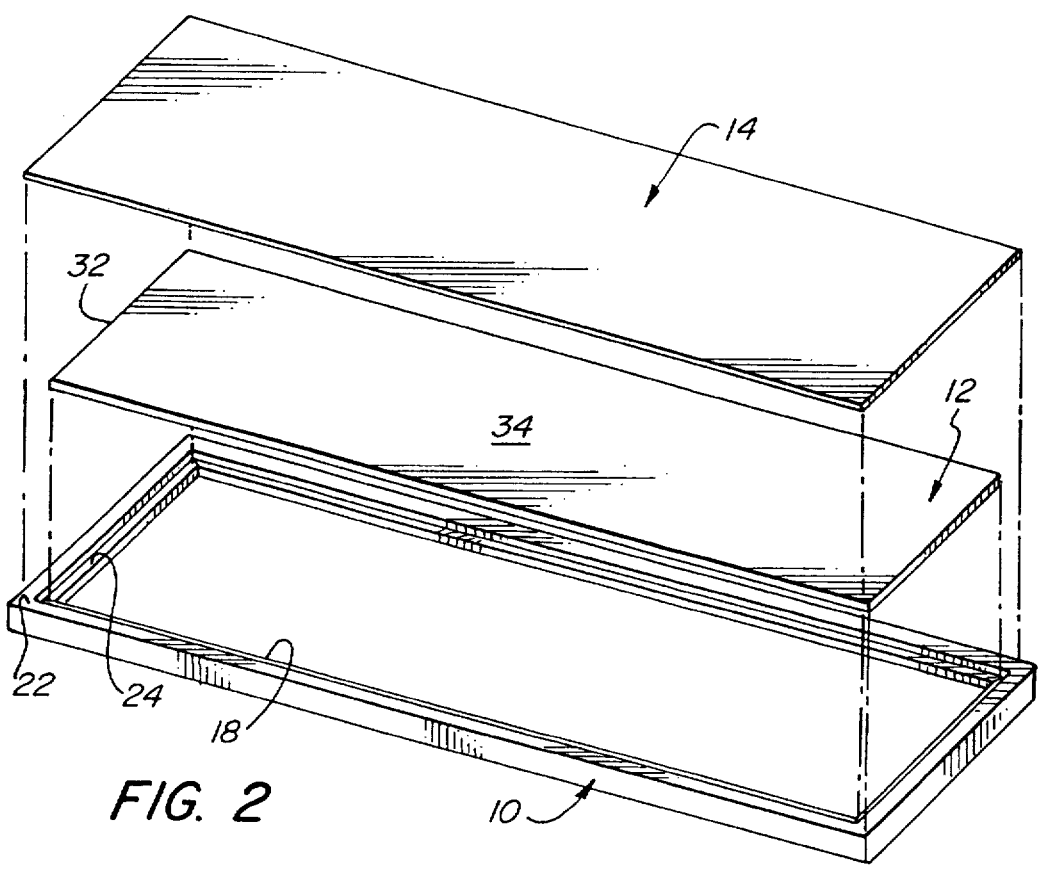
FIG. 2 is an exploded view thereof.
Figure 3:
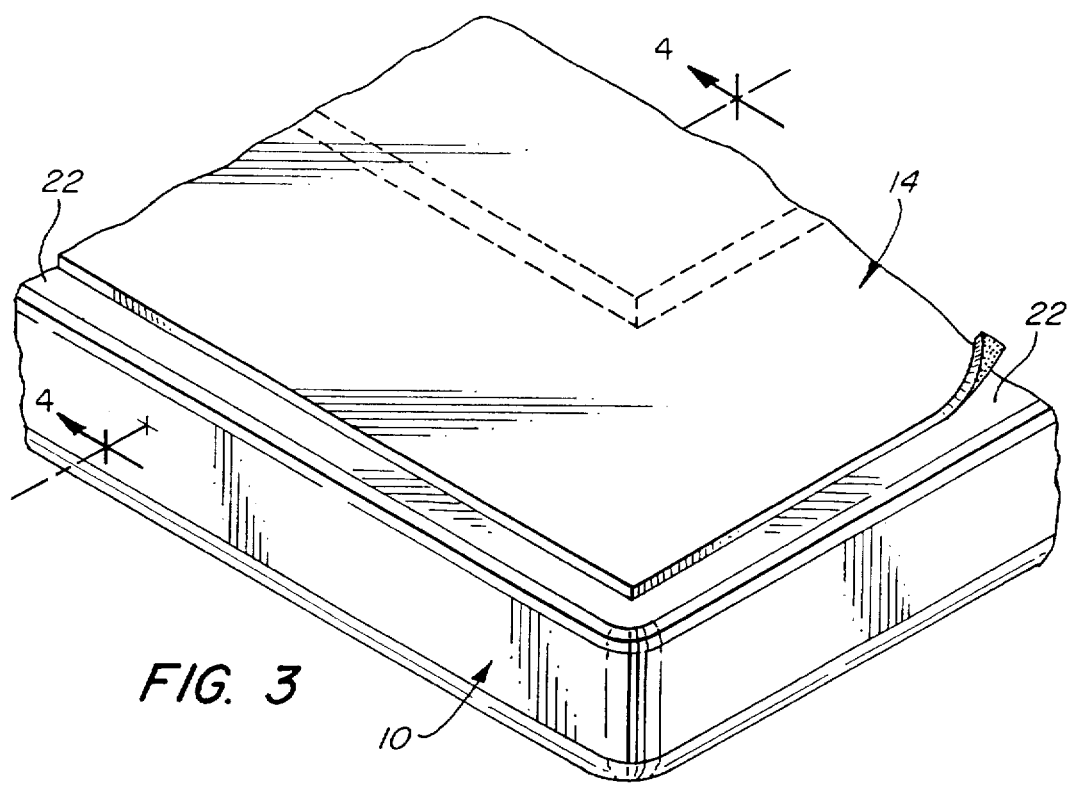
FIG. 3 is a fragmentary enlarged perspective view of the rear surface of the framed mirror of FIG. 1 with an edge of the film partially lifted.

Turning first to FIGS. 1–4, therein illustrated is a framed mirror embodying the present invention and comprised of a frame generally designated by the numeral 10, a glass mirror generally designated by the numeral 12, and a sheeting member generally designated by the numeral 14.

The frame 10 is of generally rectangular configuration and provides a central opening 18. It has a front surface 20 and a rear surface 22, and a recess 24 is provided in the rear surface about the opening 18 which provides a planar shoulder 26 extending parallel to the surfaces 20, 22 and an edge 28 extending perpendicularly thereto.

The mirror 12 has its peripheral portion of its front surface 30 seated on the shoulder 26 and the spacing of its edge 32 from the edge 28 is somewhat exaggerated. The rear surface 34 of the mirror 12 is substantially coplanar with the rear surface 22 of the frame 10.

Figure 4:
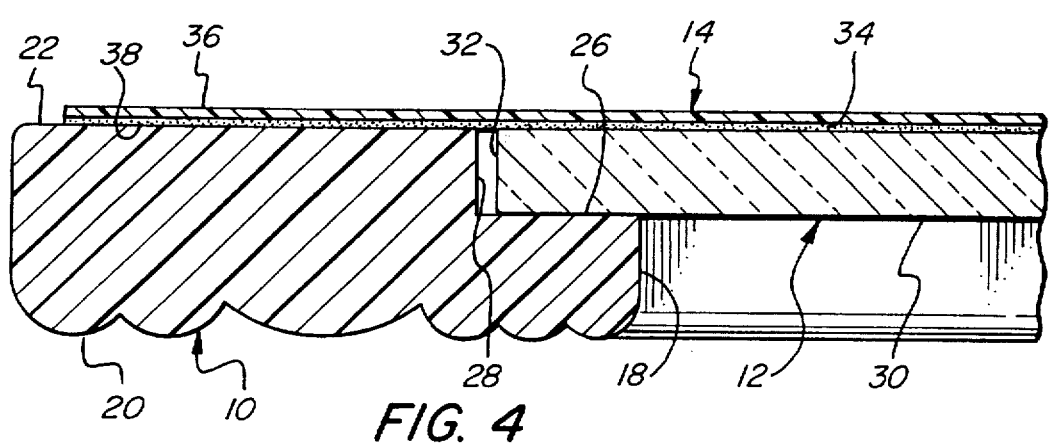
FIG. 4 is a sectional view of the framed mirror along the line 4—4 of FIG. 3.

As seen in FIG. 4, the sheeting member 14 comprises a synthetic resin film 36 with a pressure sensitive adhesive coating 38 on its face which firmly bonds to the rear surface 34 of the mirror 12 and to the rear surface 22 of the frame 10 so that the mirror 12 is sealed into the frame 10, and its edge 32 is effectively sealed to the atmosphere by the impervious nature of the film 36 and of the frame 10.

Figure 5:
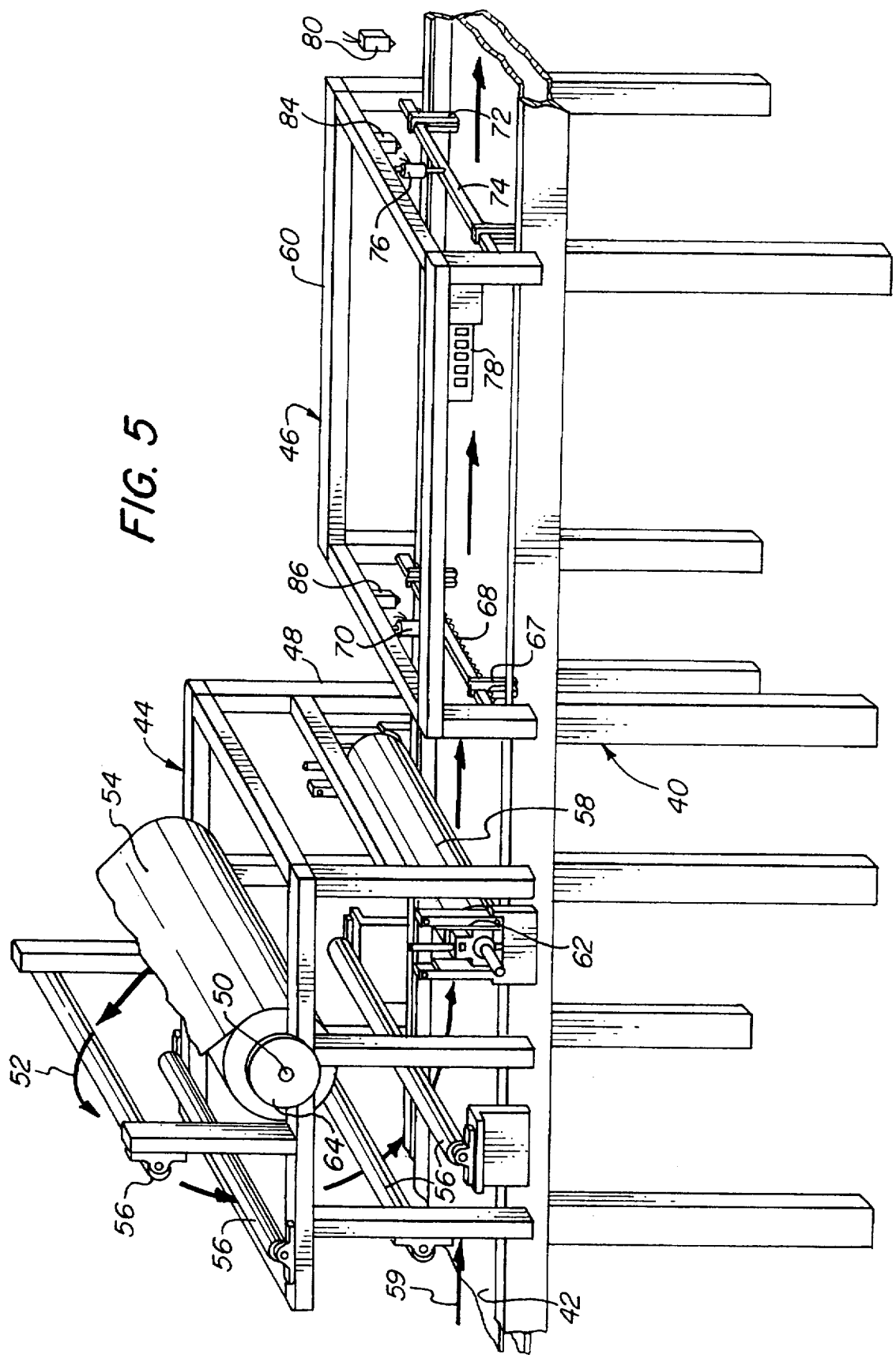
FIG. 5 is a perspective view of the apparatus utilized for laminating the framed mirror assembly of FIG. 1 with the sheeting shown fragmentary and the paths of travel of the sheeting and of the mirror and frame being indicated by arrows.
Figure 6:
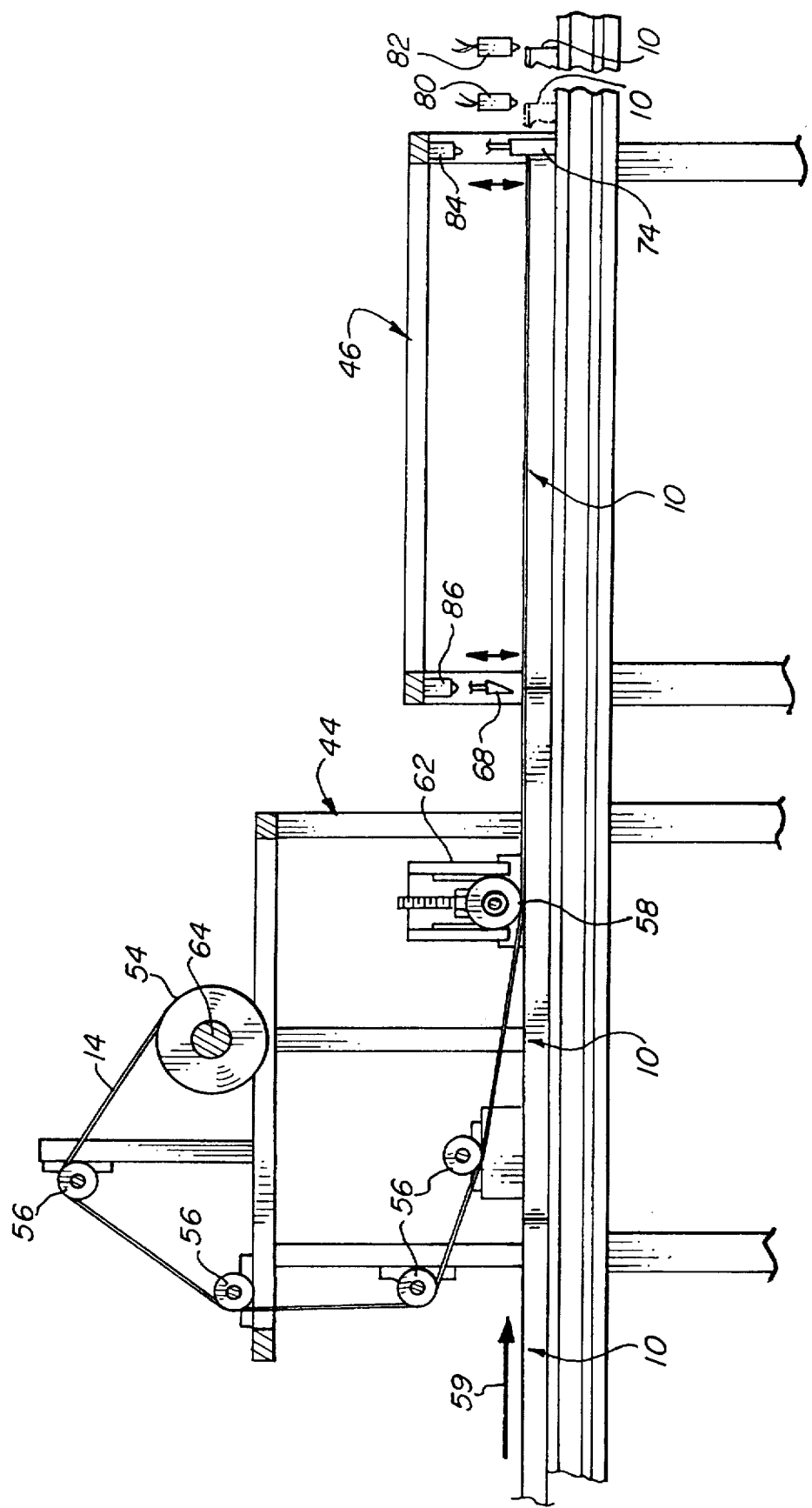
FIG. 6 is a partially diagrammatic view showing the operation of apparatus and method.

Turning next to FIGS. 5 and 6, therein illustrated is apparatus for assembling the framed mirror rapidly and with minimal operator interaction. On the base 40 is supported a conveyor belt 42 which moves in the direction of the lower set of arrows 43 and which has an outer surface which provides relatively low friction so that articles disposed thereon may be stopped as the belt 42 continues to rotate. This surface also minimizes any tendency to mar the surface of articles placed thereon, and it may be readily cleaned.

Supported on the frame are a laminating station generally designated by the numeral 44 and a cutting station generally designated by the numeral 46. The laminating station 44 includes a frame 48 upon which are rotatably supported the feed roller 50 which carries a roll 54 of adhesive coated film 14 and a series of guide rollers 56 which define the path for the film 14 from the feed roll 54 to the laminating roller 58 as indicated by the upper series of arrows 59. The laminating roller 58 is rotatably driven by the movement of the door frame on the belt and is vertically adjustable in the guide posts 62. The feed roller 50 is provided with an electrically actuated brake 64 to stop rotation of the roller 50 and thereby feeding of film 14 which in turn will stop movement of the frame 10 with the conveyor belt 42.

The cutting station 46 has a frame 66, upon the upstream end of which is vertically movable in the guide posts 67 a hot cutting blade 68 actuated by the air cylinder 70. Vertically movable on the downstream end in the guide posts 72 is a stop bar 74 which is actuated by the air cylinder 76.

Associated with each of the movable members 68, 74 is a sensor to detect the position, and the sensors send signals to the microprocessor control station 78. A sensor 80 senses when the leading edge of the frame 10 has reached this point and sends a signal to the control 78 which then releases the brake 64. In addition, another sensor 82 is provided on the conveyor 42 downstream from the stop member 74 and sensor 80 to signal the microprocessor control 78 when the leading edge of the framed mirror has reached that position.

In operation of the apparatus, a frame is placed on the conveyor belt 42 with its front surface downwardly. A mirror 12 is inserted into the central opening 18 of the frame 10 with its front surface 20 seated on the shoulder 26 of the recess 24. This assembly moves forward into the apparatus as shown in FIGS. 5 and 6. Concurrently, the sheeting member 14 is drawn from the roll 54 about the guide rollers 56 and down to the laminating roller 58 where the adhesive coating 38 comes into contact with the rear surfaces 22, 34 of the frame and mirror. The pressure applied by the laminating roller 58 as the frame and mirror pass thereunder presses the sheeting member 14 firmly against those rear surfaces to effect a secure adhesive engagement therewith.

The conveyor belt 42 continues moving the now assembled structure along the path indicated by the arrows 43 under the cutting member 68 until the leading edge of the frame 10 abuts the stop member 74. At that point, the sensor 84 associated with the stop member 74 signals the microprocessor 78 which actuates the air cylinder 70 to move the cutting member 68 downwardly to sever the sheeting member 16 closely adjacent the trailing edge of the frame 10 and the heat employed for that purpose causes shrinkage of the sheeting member 14 so that it does not project beyond the trailing edge of the frame 10.

The signal from the sensor on the stop member 74 has caused the microprocessor control 78 to concurrently send a signal to the brake 64 for the feed roller 50 so that it will not allow sheeting 14 to unroll therefrom. This caused the next adjacent frame and mirror assembly to be stopped with its leading edge abutting the trailing edge of the preceding frame and mirror assembly because the strength of the film, and its bond to its frame 10 and mirror 12 of that assembly is sufficient to cause the frame 10 to slide on the surface of the conveyor belt 42. The heat generated by the cutting member 68 also causes the short length of film projecting beyond the leading edge of the frame 10 on the next assembly to shrink so that it does not project beyond the edge of the frame 10. After the cutting member 68 has completed its travel to effect the desired severing and contraction of the film, the sensor 86 associated therewith sends a signal to the microprocessor control 78 which in turn signals the air cylinders 76 and 70 to move the stop member 74 and cutting member 68 upwardly. After the leading edge of the severed assembly reaches the sensor 80, it sends a signal which causes the brake 64 to release allowing the conveyor 42 to again move the frame and mirror under the laminating roller 58 and forwardly along the path through the apparatus.

After the leading edge of the frame and mirror assembly which has been moved forward from the stop member 74 reaches the downstream sensor 82 indicating that its trailing edge has cleared the stop member 74, that sensor sends a signal to the microprocessor control 78 which again lowers the stop member 74 into a blocking position to restrain the door/mirror assembly which is moving forward on the conveyor belt 42. This process is repeated with the conveyor belt 42 operating continuously and the several elements operating in the intermittent fashion described.

It will be appreciated that the apparatus may be adapted to frames of different lengths by adjusting the position of the downstream sensor which detects the leading edge of the completed assembly. If smaller lengths than the length of the cutter station frame are desired, than a shorter frame may be substituted.

Although the frame for the mirror may be made of various materials including wood, metal and ceramics, synthetic resin affords an advantage in that it may be integrally molded to eliminate any joints, or the joints can be fully sealed by adhesives or sonic sealing which will effect an essentially impermeable joint. Moreover, the frames may be relatively light if foamed synthetic resin such as polystyrene and other resins which lend themselves to cellular formation are employed.

Various synthetic resins may be employed for the sheeting including polypropylene, polyethylene and polyamides, but the preferred materials for use in the apparatus heretofore described are those which are biaxially oriented so as not only to provide a material with high tensile strength, but also to provide material which will rapidly shrink upon application of heat at the cutting station to eliminate any overhang of the synthetic resin sheeting. The resin should also be substantially impervious to moisture. A particularly useful material is biaxially oriented polypropylene of 1.5–3 mils thickness which is treated on the surface to which the adhesive is applied so as to ensure firm bonding thereto. The other surface which is untreated acts as a release surface to which the adhesive coating will not bond, thus enabling the coated sheeting to be coiled in rolled form.

Although various pressure sensitive or heat activated adhesives may be employed for this purpose, acrylic pressure sensitive adhesives have proven particularly advantageous when applied in thicknesses of 1–2 mils.

The laminating roller is desirably one having a compressible circumferential portion to avoid any tendency to mar the frame as it is passing thereunder while ensuring that the film will be brought into firm contact with the underlying rear surfaces of the mirror and frame. Moreover, this provides the desired friction to ensure that the laminating roll rotates as the frame is being pulled thereunder by the motion of the conveyor belt.

The conveyor belt is one which is fabricated with a smooth surface so as not to mar the frame of the mirror, and also to permit the frame to slide in a static position on the conveyor belt which is moving thereunder when the frame is stopped by either the stop member or by the action of the brake restraining unrolling of the sheeting.

Thus, it can be seen from the foregoing detailed description and attached drawings that the apparatus of the present invention is one which enables a framed mirror to be assembled readily and economically to provide a relatively secure structure. The apparatus of the present invention enables the assembly to be produced expeditiously and economically and with a minimum of operator involvement.

Having thus described the invention, what is claimed is:

1. In apparatus for making framed mirrors, the combination comprising:

(a) an elongated frame;
   (b) a conveyor extending longitudinally of said frame and defining a path therethrough with upstream and downstream ends for moving a frame with a mirror therein therealong;
   (c) a laminating roller rotatably supported on said frame above said conveyor along its path to bear upon the upper surface of a frame and mirror;
   (d) a roll supporting shaft for a roll of film rotatably supported on said frame above said conveyor;
   (e) a multiplicity of guide rollers rotatably supported on said frame providing a path for film from said roll supporting shaft to said laminating roller for bonding to a frame and mirror;
   (f) a stop member movably supported on said frame in said path at a predetermined distance downstream from said laminating roller;
   (g) a cutting member movably supported on said frame between said laminating roller and stop member at a predetermined distance from said stop member;
   (h) means for moving said cutting member into said path to cut film thereon;
   (i) means for moving said stop member into said path to stop movement of a frame and mirror on said belt;
   (j) means for stopping said feed roll shaft to prevent unrolling of film therefrom;
   (k) control means for said stopping and moving means to move said stop member into said path to stop movement of a frame and mirror on said conveyor, to stop rotation of said feed roll shaft, and to move said cutting member into said path to sever the associated film at the trailing end of the frame and mirror on said belt stopped by said stop member, and thereafter to move said cutting member from said path and said stop member from said path to release the stopped frame and mirror for movement along the path and to release said feed roll to allow unrolling of film therefrom.

2. The framed mirror making apparatus in accordance with claim 1 wherein said conveyor includes a belt with a low friction outer surface.

3. The framed mirror making apparatus in accordance with claim 1 wherein said laminating roller has a resiliently compressible circumferential portion.

4. The framed mirror making apparatus in accordance with claim 1 wherein said cutting member has a heated cutting edge.

5. The framed mirror making apparatus in accordance with claim 1 wherein said cutting member and stop member are supported for vertical movement on said frame and said moving means effect vertical movement thereof relative to said path.

* * * * *

UNITED STATES PATENT AND TRADEMARK OFFICE
CERTIFICATE OF CORRECTION

PATENT NO.   : 5,600,453
DATED        : February 4, 1997
INVENTOR(S)  : Kenneth R. Carson It is certified that error appears in the above-indentified patent and that said Letters Patent is hereby corrected as shown below:

On the title page, item [54] and column 1, lines 1-3, the title should read --COMPOSITE FRAMED MIRROR MAKING APPARATUS--.

On the title page, item [21], "531,451" should read --531,461--.

Signed and Sealed this

Thirtieth Day of September, 1997

Attest:

BRUCE LEHMAN

Attesting Officer

Commissioner of Patents and Trademarks